US007624280B2

United States Patent
Oskari

(10) Patent No.: US 7,624,280 B2
(45) Date of Patent: Nov. 24, 2009

(54) WIRELESS LOCK SYSTEM

(75) Inventor: Koskimies Oskari, Helsinki (FI)

(73) Assignee: Nokia Corporation, Espoo (FI)

( * ) Notice: Subject to any disclaimer, the term of this patent is extended or adjusted under 35 U.S.C. 154(b) by 1097 days.

(21) Appl. No.: 09/976,091

(22) Filed: Oct. 15, 2001

(65) Prior Publication Data
US 2006/0072755 A1    Apr. 6, 2006

(30) Foreign Application Priority Data
Oct. 13, 2000   (FI)   ................................. 20002255

(51) Int. Cl.
*G06F 21/00*   (2006.01)
(52) U.S. Cl. .................. 713/185; 713/182; 713/169; 726/20; 726/9
(58) Field of Classification Search .................. 380/44, 380/23, 270, 278, 279, 277, 247, 284; 713/186, 713/200, 202, 168, 169, 182, 185, 150, 155, 713/157, 159, 172, 175, 156, 170, 176; 340/5.6, 340/572.9, 542, 5.74, 5.8, 5.81, 5.82, 5.83, 340/5.85; 705/41, 64, 65, 18, 66, 67, 76; 726/2, 9, 20, 26–30, 5, 10, 19, 17, 21; 709/225, 709/229; 455/410, 411; 235/27, 130, 382, 235/382.5, 380; 70/31, 429
See application file for complete search history.

(56) References Cited

U.S. PATENT DOCUMENTS

| 4,652,860 | A | | 3/1987 | Weishaupt et al. |
| 5,602,536 | A | * | 2/1997 | Henderson et al. ......... 340/5.23 |
| 5,649,099 | A | * | 7/1997 | Theimer et al. ................. 726/4 |
| 5,815,557 | A | * | 9/1998 | Larson ...................... 340/5.64 |
| 5,987,134 | A | * | 11/1999 | Shin et al. ................... 713/159 |
| 6,038,551 | A | * | 3/2000 | Barlow et al. ................. 705/41 |

(Continued)

FOREIGN PATENT DOCUMENTS

FR    2 774 833    8/1999

(Continued)

*Primary Examiner*—Kimyen Vu
*Assistant Examiner*—Nirav Patel
(74) *Attorney, Agent, or Firm*—Banner & Witcoff, Ltd.

(57) ABSTRACT

A wireless lock and key system using an encryption key pair. When a lock senses a person nearby, the random signal is generated. The key encrypts the signal and returns it to the lock. The lock decrypts the signal and compares it to the original to determine if the lock should be opened. The key may generate temporary tickets for guests to open the lock for limited times.

58 Claims, 6 Drawing Sheets

U.S. PATENT DOCUMENTS

| | | | | |
|---|---|---|---|---|
| 6,075,860 | A * | 6/2000 | Ketcham | 713/159 |
| 6,088,450 | A * | 7/2000 | Davis et al. | 713/182 |
| 6,088,797 | A * | 7/2000 | Rosen | 713/173 |
| 6,097,306 | A * | 8/2000 | Leon et al. | 340/5.1 |
| 6,138,235 | A * | 10/2000 | Lipkin et al. | 713/155 |
| 6,161,182 | A * | 12/2000 | Nadooshan | 713/172 |
| 6,175,922 | B1 * | 1/2001 | Wang | 713/182 |
| 6,279,111 | B1 * | 8/2001 | Jensenworth et al. | 726/10 |
| 6,484,260 | B1 * | 11/2002 | Scott et al. | 713/186 |
| 6,690,794 | B1 * | 2/2004 | Terao et al. | 380/22 |
| 6,711,679 | B1 * | 3/2004 | Guski et al. | 713/156 |
| 6,747,564 | B1 * | 6/2004 | Mimura et al. | 340/825.6 |
| 6,826,690 | B1 * | 11/2004 | Hind et al. | 713/186 |
| 6,975,202 | B1 * | 12/2005 | Rodriguez et al. | 340/5.25 |
| 6,980,660 | B1 * | 12/2005 | Hind et al. | 380/282 |
| 7,000,110 | B1 * | 2/2006 | Terao | 713/172 |
| 7,009,489 | B2 * | 3/2006 | Fisher | 340/5.7 |
| 7,012,503 | B2 * | 3/2006 | Nielsen | 340/5.6 |
| 7,113,994 | B1 * | 9/2006 | Swift et al. | 709/229 |
| 7,124,938 | B1 * | 10/2006 | Marsh | 235/382 |
| 2003/0014315 | A1 * | 1/2003 | Jaalinoja et al. | 705/18 |
| 2003/0030542 | A1 * | 2/2003 | von Hoffmann | 340/5.61 |

FOREIGN PATENT DOCUMENTS

| | | |
|---|---|---|
| WO | 9314571 | 7/1993 |
| WO | WO 98/07249 | 2/1998 |
| WO | 9922486 | 5/1999 |
| WO | WO 00/32002 | 6/2000 |
| WO | 0045582 | 8/2000 |
| WO | 0056105 | 9/2000 |
| WO | 0062521 | 10/2000 |

* cited by examiner

WIRELESS LOCK SYSTEM

BACKGROUND OF THE INVENTION

1. Field of Invention

The invention relates generally to a wireless lock and key system and more particularly to controlling and managing an electronic lock, key and control device, and to creating easily distributable temporary keys to said locks.

2. Description of the Prior Art

Current locks are all based on the principle of a shared secret between the lock and the key. There are four main lock types, and each has its problems:

1) Mechanical locks, where the secret is the way the key is formed.
   - The user has to carry a separate key for each lock he can access.
   - The keys have to be dug out of handbag or pocket every time a door is opened.
   - Distribution of keys is cumbersome and has to be done by hand.
   - Creating keys requires special equipment.
   - Invalidating keys is hard.
   - The use of keys cannot easily be limited (e.g. to office hours).
2) Electronic locks with (possibly wireless) keys, where the secret is an access code stored in both lock and key.
   - While a key may have space for several codes, this is uncommon and the number of codes is limited. Thus, the user still has to carry many keys, especially as the systems are incompatible with each other. Note that if the same code is used in all locks, then the owner of any lock is able to create a key for opening all the other locks. Thus, you would have to trust the owners of all locks that you use.
   - Distribution of keys is cumbersome and has to be done by hand.
   - Creating new keys usually requires special equipment, and even if a key can store several codes, access to the lock is required. While access to the lock is not necessary if a single, known code for the lock is always used, this would also mean that all the created keys share the same code and cannot be separately controlled. For instance, it would not be possible to revoke just a single key.
3) Keyless mechanical or electronic locks, where the user has to remember the code and enter it whenever access is needed.
   - While the user does not have to carry keys, he has to remember all his codes, which is actually worse for many people.
   - Creating new keys (codes) requires access to the lock.
   - While codes can be distributed electronically, they can be used by anyone, making use of secure channels necessary.
   - The code can be learned by secretly observing the user as he enters the code.
4) Keyless electronic locks, where the user's fingerprint, retinal scan or other similar feature is used for identification.
   - The required scanning devices are expensive.
   - Creating new "keys" requires access to the lock.
   - In theory, if your information is stored on a lock, the owner of that lock can use that information to e.g. create a replica of your finger for opening all locks you have access to.

U.S. Pat. No. 6,098,056 shows a method for controlling access to data through the Internet. A server is coupled to a storage device for storing the data which is encrypted using a random generated key. This is further encrypted with the server's public key. A trusted information handler is validated by the server. After the handler has been authenticated, the server key decrypts the data with its private key and re-encrypts the data with the handler's public key.

U.S. Pat. No. 6,289,455 shows a cryptographic method to regulate access to data. Rights keys which allow access to the data are added to a cryptographic unit by transforming data received from a control processor and storing the result. The unit then produces content decrypting keys by storing rights keys to transform other data received from a processor. Because the processor design has the ability to directly access the protected memory, security can remain effective even if the processor is compromised.

U.S. Pat. No. 5,673,316 shows a method to control access to data using cryptographic envelopes. An envelope is an aggregation of information parts, where each of the parts to be protected are encrypted with a corresponding part encryption key. Each part encryption key is also encrypted with a public key.

U.S. Pat. No. 4,914,698 shows method for issuing blind digital signatures which are untraceable.

International PCT published application 01/22760 shows a system for setting up a wireless transmission connection transmit identification messages.

While the prior art shows a number of different types of key and lock arrangements, they are all subject to a number of shortcomings by requiring the carrying of a number of keys or knowing various codes.

SUMMARY OF THE INVENTION

One aspect of the present invention is to provide a wireless lock and key system.

Another aspect of the present invention is to provide a wireless lock and key system which utilizes an encryption key pair.

A further aspect of the present invention is to provide a wireless lock and key system having the ability to generate tickets to be used by other authorized persons.

A still further aspect of the present invention is to provide a wireless lock and key system where a single key may be used with a plurality of locks.

Another aspect of the present invention is to provide a wireless lock and key system which further includes a control device for loading data into the key.

Another aspect of the invention is to provide a method for managing and controlling locks, which increases security and enables creation of temporary or otherwise limited, easily distributable keys (also referred to as "tickets").

In accordance with the embodiment of the invention, digital signatures and public key cryptography are used to solve the problems mentioned in the previous sections. Each user has a key device. Preferably a user has only one key device in use at a time. Key devices contain both a public and a secret key (hereafter a public key-secret key combination is referred to as an RSA key pair. However, some other public key cryptosystem could also be used. Lock devices contain the public keys of all the users that have permission to open the lock. Additionally, separate control devices may be used for controlling lock and key devices to minimize the need for control panels, allowing key and lock devices to be small.

In the preferred embodiment of the invention, wireless communication is used between lock devices, key devices and control devices. The wireless communication devices are preferably short range communication like Bluetooth devices, for reasons of price, power consumption, compatibility and size. In the following, it is assumed that Bluetooth devices are used, as the described methods utilize Bluetooth security features. However, other systems that offer basic authentication and encryption support could also be used.

A user is given the right to open a lock ("given a key") by storing the public key of the user's key device on the lock. Note that in this way a key device can open an infinite amount of locks, but only needs to store one RSA key pair. Also, the owner of a lock is unable to open any other locks the key device can open, since he only knows the public key of the key device.

When a key device detects a nearby lock device, it requests access. The lock device issues a challenge in the form of a random code. The key device encrypts the code with its secret key, and sends the result to the lock, who decrypts it with the public key of the key device that was stored in the lock earlier. If the decrypted code is the same that the lock device originally sent, the lock opens.

Access permissions, or "tickets" can be created by specifying a list of limitations (such as who is able to use the permission and when), and digitally signing the permission with the secret key of a user that has access to the lock in question (meaning, his public key is stored in the lock). The lock is then able to verify that the permission was created by a user authorized to do so. Since the ticket can be limited to a certain person by including the public key of the person in question in the ticket, unsecure channels (such as email) can be used in distributing tickets. Even if someone else is able to copy the ticket, he cannot use it without knowing the secret key of the legitimate user.

Tickets are stored on key devices. The number of tickets a key device can store is limited by the amount of storage space (non-volatile memory) available.

Note that while creating keys requires access to the lock device, tickets can be created just by using a key device whose public key is stored in the lock device. It is even possible to create tickets that allow the creation of more tickets. The ticket holder simply creates a new ticket, signed with his own secret key, and appends the original ticket (a more detailed description is provided in the next section). This means that tickets are in fact equivalent to keys in terms of functionality—the only drawback is that more storage space is required in the key device.

Tickets can also contain additional information, i.e. information that is not related to the lock and key devices or access control. This additional information may contain user-related information such as e.g. user preferences.

Lock and key systems according to an embodiment of the invention can be used in addition to the traditional door opening applications, also in "virtual lock and key" systems wherein the "virtual lock" is a software module controlling access to digital resources such as e.g. to a computer and/or to a file therein or giving access to a database through a computer or another access device such as e.g. a PDA or a mobile phone. The access device and/or a data file and/or a database containing one or more data files can be 'locked' against unauthorized access and/or use. The idea is that the same key device that is used to access physical locks can also be used in connection with access to virtual locks. Thus, the user uses his (physical) key device to open a virtual lock just as he would open a physical lock. The opening may happen automatically without user intervention, or user confirmation may be required, or the user may be required to additionally authenticate himself (to guard against stolen key devices) with a PIN, fingerprint, retinal scan or similar procedure.

A computer terminal and/or a device connected to it and/or a peripheral device can also be locked with a physical lock against unauthorized use or against unauthorized removal from their location or even against theft. Also opening of these locks is within the scope of the invention.

BRIEF DESCRIPTION OF THE DRAWINGS

The present invention is more easily understood with reference to the drawings, in which.

DETAILED DESCRIPTION OF THE PREFERRED EMBODIMENT

Figure 1:
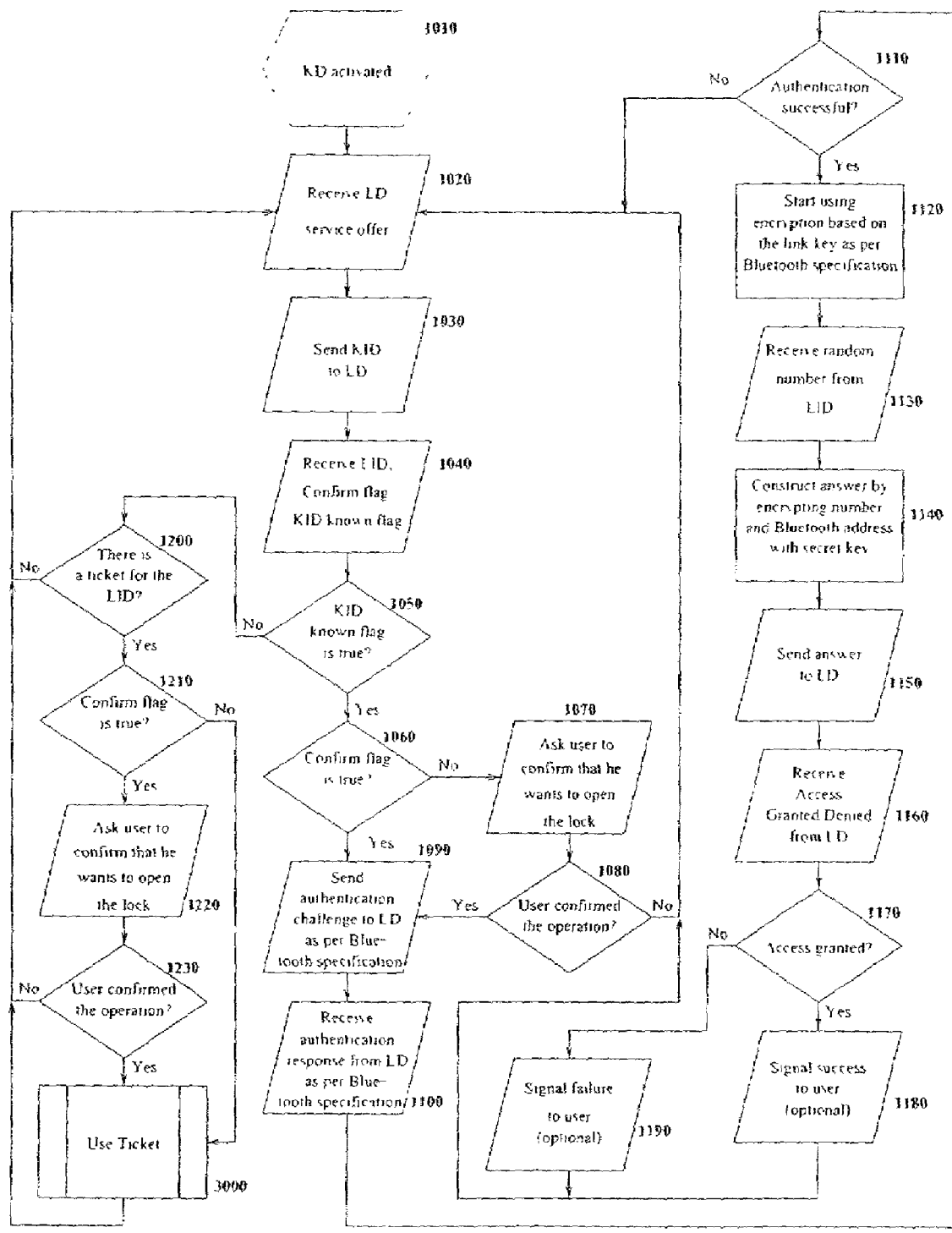
FIG. 1 is an embodiment of the flowchart for opening a lock with a key, from the key device point of view.

The basic environment of the embodiment of the present invention is to utilize an electronic key for wirelessly opening an electronic lock. The key is carried on a person either as part of his wireless telephone or as a separate unit which can be carried or worn on his person, such as in a belt buckle or in a piece of jewelry. When a person approaches the lock, his presence is sensed. Either the lock or the key may initiate the transaction. In a preferred embodiment the lock transmits a signal to see if a key is carried by the person. The lock sends a random data signal to the key. The key encrypts this data and sends it back to the lock. The lock decrypts the signal and, if it matches the original signal, opens the lock.

The encryption uses an encryption key pair system, with the public key being carried in the lock and the private key being carried in the key. This allows the user to use a single key for multiple locks. Thus, his public key may be stored in any number of locks, so that a single key is operational in all of them. Likewise, public keys of other people may also be stored in various locks, so that many people may be authorized to use the same lock.

In order to grant temporary access to a lock, a key may be given the authority to issue tickets to others which will also open the lock. These tickets may be used only a given number of times or may be used only at certain times of the day. Tickets can also be given the authority to grant additional tickets if desired. Tickets may have an expiration date if desired.

The embodiment of the present invention relies on the use of digital signatures to authenticate tickets. It further relies on chaining signatures in such a fashion that each signature authenticates the next one, to authenticate tickets created from other tickets (delegated certificates). By way of illustration and not by way of limitation, specific ticket contents and methods for verifying and authenticating tickets and keys are given in the description.

Similarly, the listed components of a device show the preferred embodiment of the present invention, and other configurations are also possible. For example, instead of placing the confirmation input device on the key device, it can be placed on the control device, which then forwards the confirmation to the key device. For another example, a key device might have an LCD display that shows the tickets that have been stored to the device.

Similarly, lists of information that a device may contain describe the preferred embodiment of the invention. The embodiment of the present invention can be adapted for a variety of needs by varying the information present on devices (including, but not limited to, the variation possibilities given by the lists of optional information). For example, storing user names on key devices is useful, but not essential. Adding information to devices allows a number of specialized uses. For example, by adding a social security number and the public key of the key device, both digitally signed by a state agency, a key device can be used for identification purposes.

The embodiment of invention preferably uses Bluetooth security features (specifically the different types of link keys and their use) and public key cryptography. Information about Bluetooth is available from http://www.bluetooth.com/, and a good starting point for public key cryptography is the Usenet cryptography FAQ at e.g. http://www.landfield.com/faqs/cryptography-faq/. Other communication systems can also be used.

It should be noted that whenever digital signatures by a "well-known trusted authority" are spoken of, the signatures can be chained so that there is one known central authority, who gives out authorizations to other organizations to create signatures. The authorization is then in the form of the public key of the receiving organization, encrypted with the private key of the central authority. The organization can then sign information with its own secret key, and enclose the authorization from the central authority.

The authenticity of the information can be checked by first decrypting the authorization with the (well-known) public key of the central authority (proving the organization has the right to produce signatures), using the resulting public key of the organization to decrypt the signature (proving that the signature is produced by the organization the authorization is for), and checking that the signature matches the information (proving that the information has not been tampered with). In this way, one only has to know the public key of the central authority to check the authenticity of any information, but the central authority does not itself have to sign all the information—it can delegate that to other trusted parties which do not have to be well-known.

A key device (hereafter KD) consists of a power source, a processing unit, storage (volatile and non-volatile memory), a communication device (preferably a Bluetooth wireless communication device), a confirmation input device (e.g. a button) and a confirmation request output device (e.g. a LED light). It may also have an emergency power socket that can be connected to a similarly equipped lock device (hereafter LD). A KD may further have a motion detector that allows it to switch off in order to conserve power when the KD is not moving. A KD may also have additional output devices for signaling success, failure, low power etc.

A KD stores the following information:
A unique key device identifier, hereafter KID. A KID may or may not be changeable. Using e.g. the Bluetooth device address would make duplicating KDs impossible.
A Unit Key (as per Bluetooth specification).
A code used for controlling the KD, hereafter KD PIN code.
An RSA key pair.
The tickets of the user (maximum number may vary)

User name.
Optionally, a KD may also store the following information:
List of lock device identifiers for the LDs the KD can open, possibly also their human-readable names.
Combination keys (as per Bluetooth specification) of LDs.
User information, such as employee number, address, etc. The information may be encrypted and/or digitally signed.
User authentication information, such as an access code, a fingerprint, a retinal scan, etc. The information may be encrypted and/or digitally signed. This can be used to guard against stolen KDs.
A use counter for each ticket with a limited number of uses.
An authentication token that contains the Bluetooth address (or a similar, unique network address if another communication technology is used) of the KD, digitally signed by a well known trusted authority. The idea with the token is that such a token is only given to "secure" devices that cannot easily be used to copy tickets with a limited number of uses or to otherwise commit fraudulent acts. The token can be used to certify that the KD behaves in a certain way. Note that the token offers only limited security, since network addresses can of course be duplicated, or the Bluetooth device of a secure KD can be removed and planted in an unsecure device. However, the token scheme significantly raises the effort needed to commit fraudulent acts, since a KD cannot then be compromised using software alone. The system then compares favorably to traditional paper tickets which are easy to forge. Note also that copied tickets are a problem only if the ticket has a limited number of uses, there are several lock devices where they can be used, the lock devices cannot constantly communicate with each other to share information about ticket use, and fraud detection after the fact is not sufficient.

The advantage of placing user authenticating information on the KD is that the information can be used by different, independent LDs to authenticate the user. The disadvantage is that if a KD is stolen, the information could conceivably be read from it. Also, owners of other LDs would know the information since the user has to enter it when opening an LD. Thus, only information like fingerprints and retinal scans, which are known by other LDs that use similar security features in any case, should be stored unencrypted on the KD. The information should still be digitally signed, together with the KID, by some well-known trusted authority to guard against stolen KDs whose authentication information has been overwritten with counterfeited information.

Authentication information like access codes, that depend on the information being secret, should be encrypted by the LD that stores it on the KD. The information cannot then be generally used, but it is still useful, since it can be used by different LDs which are owned by the same authority but do not have contact with each other (other than sharing the same encryption key).

It should be noted that even storing unencrypted and unsigned authentication information on the KD is still a valuable security feature, since even if the KD is stolen, reading or counterfeiting the information requires technical knowledge and equipment unavailable to most criminals. For example, a fingerprint stored on the KD in unencrypted form significantly enhances security for LDs that have fingerprint scanning capability.

An LD consists of a power source, a processing unit, storage (volatile and non-volatile memory), a communication device (preferably a Bluetooth wireless communication device), and (assuming the LD is installed as a door lock) a device that mechanically locks and unlocks the door. An LD may also have an emergency power socket for KDs that have run out of power. An LD may further have input devices for reading user authentication information, such as keypads, fingerprint or retinal scanning devices, etc. An LD stores the following information:

- A unique lock device identifier, hereafter LID. A LID must be changeable to support the copying of locks.
- A human-readable name for the lock.
- A Confirm flag that specifies whether users should confirm unlocking the door by operating the confirmation input device on the KD.
- A code used for controlling the LD, hereafter LD PIN code.
- For each KD that can open the LD:
    - KID.
    - User name.
    - Bluetooth Link key.
    - KD public key.
    - Access rights (e.g. time period when the KD has access, whether the KD is authorized to create new keys or tickets, what kind (e.g. almost one-day) of tickets the KD can create if any, whether they KD is authorized to perform key management operations on the lock device).

Optionally, an LD may also store the following information:

- User authenticating information, such as access codes, fingerprints, retinal scans, etc., to guard against stolen KDs. Note that this information could also be stored on the KD.
- A key for encrypting and decrypting the above information when they are stored on a KD.
- A list of untrusted public keys and ticket identifiers (hereafter blacklist, see below). Any ticket that contains one of these public keys or ticket identifiers is invalid. Also, any KD whose public key is in this list cannot store its public key on the LD.

When adding a key to this list, any KD with that public key must also be removed from the LD's KD database. Additionally, each ticket identifier on the blacklist may have a validity date, after which the ticket is invalid in any case. This allows obsolete information to be purged from the blacklist. Furthermore, a ticket identifier on the blacklist may have a counter that gives the number of times the ticket has been used. This allows tickets that can be used n times. These tickets are still valid, until the use counter reaches the maximum number of allowed uses.

Link keys are used by Bluetooth for authentication. Normally, Unit keys of KDs are used. This allows the KD to authenticate an LD as one of the LDs it has stored its Unit key on. Alternatively, Combination keys can be used to allow LDs to be authenticated individually. This may sometimes be useful for management operations. The disadvantage is that a separate Link key has to be stored on the KD for each LD.

Changing the Unit key of a KD will make all locks fail authentication to the KD. However, the KD will still be authenticated to the locks since the KD's RSA pair is used for that. Thus, the KD will still be able to open LDs.

LIDs are hierarchical(e.g. "customer number"—"site number"—"lock number") to facilitate master keys. If a KD can open an LD, it can also open any LD beneath it in the hierarchy. Technically this is only necessary for the tickets, since the KDs rely on the LDs to check whether their public key is stored on the LD or not.

Finally, note that the wireless nature of the solution allows LDs to be placed inside the door, making tampering impossible. If the LD includes an emergency power socket for out-of-power KDs, the socket has to be located on the outside, but since it is used solely for power transfer it cannot be used for tampering with the lock. Of course, placing the LD on the inside of a door is feasible only if there is some other way of getting inside if the LD malfunctions.

KDs and LDs are controlled via separate control device (hereafter CD), that also includes a Bluetooth device. LDs can also have a built-in CD, or a wireline connection to an external control system.

A CD is also a KD. The access rights for the CDs public key stored on the lock must enable control operations.

To create initial keys, an LD PIN is used (as per Bluetooth specification) for both authentication and encryption. The KD PIN is used for authentication and encryption between KDs and CDs.

If the Bluetooth technology is successful, many mobile phones will be equipped with Bluetooth devices to enable them to be connected to similarly equipped computers. A Bluetooth-enabled mobile phone is also an optimal CD:

- Most people will have one.
    - PIN-based KD security controls (e.g. enable/disable KD) can be tied to those of the phone (e.g. enable/disable outgoing calls).
- Keys and tickets can be transmitted with the phone.
    - A phone can also itself function as a KD. This is extremely valuable, since it would make achieving "critical mass" for the system much easier.

A key can be created whenever the LD and the KD are in contact. A CD must be used to activate the LDs key creation sequence. The LD will then show (via the controller) the user names of all unknown key devices in range. A key device is selected by the user of the LD.

Optionally, a temporary PIN code can be selected for authentication and encryption between the LD and the KD, as per Bluetooth specification. In that case, the PIN must also be entered to the KD using a controller.

The LD sends a key registration request to the KD. If a temporary PIN was not used, the KD signals the user of the KD via the confirmation request output device, and awaits an action on the confirmation input device. After the used has activated the input device, the KD sends its KID, user name, link key and public key to the LD. Access rights for the KD must then be entered to the LD via its CD.

The link key is either the KD's Unit key, or a combined key can be created (as per Bluetooth specification). In the latter case, both the combined key and the LID must be stored on the KD. In any case, the KD may store the LID to keep track of the locks it has access to.

KD registration can be done remotely by sending the above information via any electronic media to the controller. While the media need not be secure against eavesdropping, it should be secure against an attacker replacing the information with his own.

A KD that is not a CD can also have the right to create new keys. In that case, a CD must be used to ask the KD to create the key and for controlling the process. The KD will effectively act as a mediator between the CD and the LD.

Turning now to the drawings, the method of operation of these devices is now described. The numbering in the flowcharts follows the following conventions:

- The first digit in a number is the number of the figure. Thus, when a number is given, a reference to the figure is not necessary.
- Even thousands signify the whole flowchart, and are only used in flowchart references (e.g. 5000 signifies the flowchart in FIG. 5).

Figure 2:
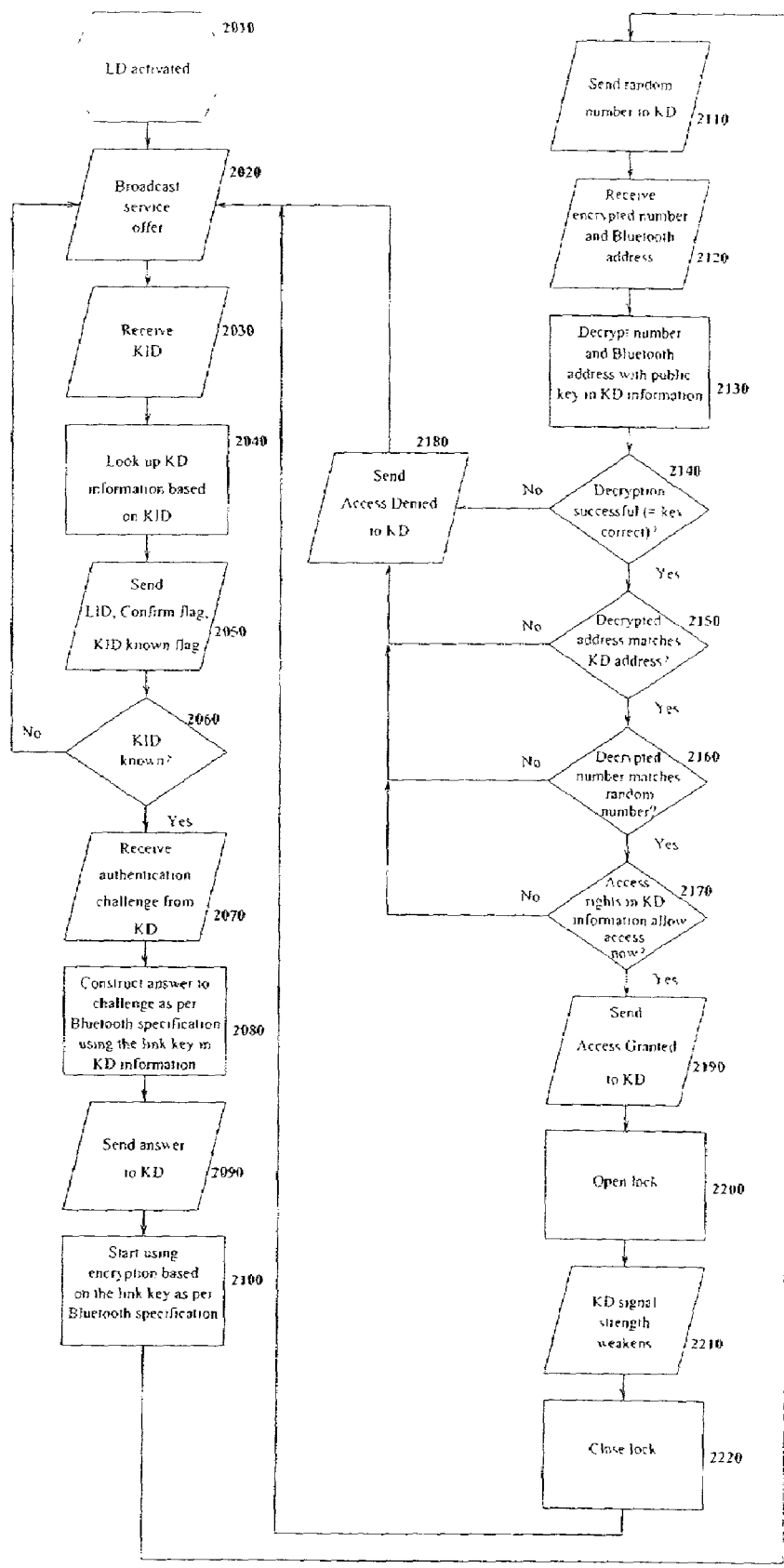
FIG. 2 is an embodiment of the flowchart for opening a lock with a key, from the lock device point of view.

Except for iteration and flowchart references, the numbering is ordered so that if item X happens after item Y, then X has a number greater than Y. Figure I shows an embodiment of the process of using a key, from the KD point of view, as a flowchart. FIG. 2 shows an embodiment the process of using a key, from the LD point of view, as a flowchart.

1) The LD broadcasts its service (2020, 1020).
2) The KD sends its KID (1030, 2030) to the LD, which looks up the KID in its database (2040). The LD then replies with its LID, Confirm flag and a flag that tells if the lock knows the KID (true in this case) (2050, 1040). If the confirm flag was true (1060), the KD signals a confirmation request to the user (1070) and awaits confirmation.
3) The KD authenticates the lock with its link key according to Bluetooth specification (KD challenges, LD responds) (1090, 2070, 2080, 2090, 1100). Note that the LD finds the KD's link key based on the KID, not on the KD's Bluetooth address.
4) Encryption based on the link key is taken into use (1120, 2100). The LD sends a random number to the KD (2110, 1130). The KD encodes the random number and its Bluetooth address with its secret key (1140), and sends the result to the LD (1150, 2120).
5) The LD decrypts the encrypted number and address using the public key that corresponds to the KID (2130). If the decryption is successful (meaning that the key is correct) (2140), the address matches the one the KD has (2150), and the number matches the one the LD sent (2160), and the access rights of the user allow him to get in now (2170), then the user is authorized to open the lock(2190, 1160-1180, 2200). Closing the lock again could be based on a simple timeout (lock stays open for a predefined time interval), but preferably the LD would use radio signal strength to get some measure of the distance to the KD, and when signal strength is sufficiently weak (2210), close the lock again (2220).

Preferably, public key cryptography is used to authenticate KDs to LDs, because then it is enough to store a single RSA key pair on the KD. However, it is also possible to store a separate key for each LD on the KD. This has the disadvantage that more storage is required, but the advantage that a more efficient cryptographic method (such as block cipher) can be used instead of public key cryptography. Preferably, Bluetooth combination keys should be used, since they can then easily also be used to individually authenticate LDs.

A KD contains all the tickets of its user. A ticket can be created based either on a key or another ticket. In the former case we use the term original ticket, and in the latter case we use the term derivative ticket. In literature, the term delegated certificate is also used for the same concept.

Each ticket is assigned a unique ticket identifier (hereafter TID) when creating it. A TID is useful for two things: It allows tickets to be revoked individually (by storing the TID on a blacklist on the LD) and it allows single-use tickets (by marking the ticket as single-use in its access limits and having the LD store the TID of tickets so marked on its blacklist after use). The method can be expanded to tickets with n uses (hereafter n-use or N-use tickets) by storing the total number of allowed uses in the ticket's access limits, and by adding a count to the blacklist that is increased with each access. The ticket is then refused only when the access would actually increase the count in the blacklist above the total number of allowed accesses stored in the ticket's access limits. Note that tickets with a limited number of uses should preferably also have a validity time limit (a not-after date) to allow LD's to purge obsolete information from their blacklists.

If a n-use ticket can be used for several LDs, which are not in contact with each other, it is possible to copy the ticket and use it several times, since the LDs cannot keep track of the total number of uses. If LDs store ticket use information, this can later be detected by combining the data in the different LDs, and the fraudulent user can then be identified. However, detection after the fact is obviously not appealing. The security can be strengthened by requiring that the KDs of the ticket receivers have an authentication token from a well-known trusted authority, that contains the KD's Bluetooth address (or a similar unique network address if another communication technology is used), digitally signed by the authority. The idea is that such tokens are only given to KDs that cannot easily be used for copying tickets. Such KDs would of course also only allow derivative tickets to be created for KDs that have a similar authentication token.

Preferably, a CD is used for creating tickets. If the LD supports a blacklist of TIDs, the TID (that is included in the ticket) should preferably be stored on the CD, so that, if necessary, the ticket can later be revoked by adding the TID to the blacklist. If the ticket has a validity time limit, that should be stored on the CD as well, so that it also can be stored on the blacklist.

A ticket based on a key contains a LID, a TID, the KID of the granter, a link key, the public key of the receiver, access limits, the maximum number of levels of derivative tickets, limits on the derivative tickets (e.g. only one-day derivative tickets may be created) and a checksum encoded with the secret key of a user authorized to grant such tickets.

The link key of a ticket is created using a (well-known) secure one-way hash on the granter's link key and the LID.

A derivative ticket contains a LID, a TID, the public key of the receiver, access limits, the maximum number of levels of derivative tickets, limits on the derivative tickets, a checksum encoded with the secret key of the granter, and additionally the original ticket that the granter has. Note that derivative tickets may be nested to an arbitrary depth.

A KD may store and maintain a use count for a n-use ticket to keep track of how many uses the ticket has left. The use count is then increased with each use, and compared to the total number of uses in the ticket to get the number of remaining uses (alternatively, a decreasing counter could also be used). Note that when a n-use derivative ticket is used, the use count is increased for all its n-use nested tickets as well. This means that when a n-use ticket is used to create derivative tickets, the owner of the first ticket cannot know any more how many uses his ticket has at a certain time. We call tickets with this kind of shared number of uses shared tickets. Alternatively, if the derived ticket is created with fewer uses than the first ticket, and the number of uses of the derived ticket is added to the use count of the first ticket, the owners of both tickets then know exactly how many uses their tickets are good for. We call tickets with this kind of individual number of uses unshared tickets. KDs should maintain information about the sharedness of their tickets. Note that keeping a use count for shared tickets only gives you the maximum number of remaining uses. Also note that if a ticket is used to create a shared derivative ticket, the first ticket automatically becomes shared as well.

If public key cryptography is not used, then the checksum in an original ticket T1 is encrypted with the secret key K1 that the KD creating the ticket has for the lock. Additionally, a new secret key K2 (preferably a Combined key as per Bluetooth specification) is created and shared by the KD creating the ticket (KD1) and the KD receiving the ticket (KD2). Instead of the public key of the receiver, KD1 includes in the ticket K2, encrypted with K1. KD2 stores the K2 together with the ticket. The LD can then verify the ticket by decrypting the checksum with the secret key it has stored for the KD1 (K1), and verifying that the checksum is correct. The LD can further verify that KD2 is the KD the ticket was created for, by similarly decrypting K2 with K1, and issuing an authentication challenge as per Bluetooth specification to KD2, using K2 as the link key.

If public key cryptography is not used, then derivative tickets are created as follows: Assume KD2 from previous paragraph wishes to create a derivative ticket T2 for another KD (KD3). It proceeds otherwise as with public key cryptography, but encrypts the checksum using the secret key K2 it has stored for its own ticket. A new secret key K3 is then created and shared by KD2 and KD3 (preferably a Combined key as per Bluetooth specification). KD2 encrypts K3 with K2, and includes it in the new ticket instead of the public key of the receiver. When the LD verifies the ticket, it can obtain K2 from the original (nested) ticket as explained in the previous paragraph. It can then decrypt K3, and authenticate KD3 as per Bluetooth specification, using K3 as the link key. In this way, tickets can be nested arbitrarily deep.

Below is a description of tickets in Backus-Naur Form notation. It assumes public key cryptography is used. Note that on derivative tickets, the term "granter" refers to the immediate granter (who has a ticket), not the original one (who has a key).

1) The LD broadcasts its service (2020, 1020).
2) The KD sends its KID (1030,2030) and the LD replies with its LID, Confirm flag and a flag that tells if the LD knows the KID (false in this case) (2040, 2050, 1040, 1050).
3) The KD finds that it has a valid ticket for the LD (1200). If the confirm flag was true (1210), the KD signals a confirmation request to the user (1220) and awaits confirmation.
4) The KD tells the lock the KID of the granter of the (if nested, innermost) ticket (3030). It authenticates the LD with the ticket link key according to Bluetooth specification (KD challenges, LD responds) (3030, 4030-4080, 3040, 3050). The LD finds the granter's link key based on the granter KID (4040), and can then create the required link key by applying the hash function (4050).
5) Encryption based on the link key is taken into use (3060, 4090). The LD sends a random number to the KD (4100, 3070).
6) The KD encodes the random number and its Bluetooth address with its secret key (3080) and adds the ticket. The result is sent to the LD (3090, 4110).
7) The LD decrypts the encrypted number and address using the receiver public key in the ticket (4120).
8) If the decryption succeeds (meaning the key was correct) (4130), the decrypted address matches the KD's address (4140), the decrypted, number matches the previously sent random number (4150), the ticket is successfully

| | |
|---|---|
| <Ticket> := | <Original_ticket> \| <Derivative_ticket> |
| <Original_ticket> := | <LID> <TID> <Granter_KID> <Link_key> <Receiver_public_key> <Access_limits> <Max_derivation_level> <Derivation_limits> <Checksum> |
| <LID> := | <LID> of the LD the ticket can open. |
| <TID> := | Unique ticket identifier. |
| <Granter_KID> := | KID of the granter's KD. |
| <Link_key> := | A link key created by applying a well-known secure one way hash function (e.g. MD5 or SH-1) on the <LID> and the link key that is stored on this LD for the granter's KD. |
| <Receiver_public_key> := | The public key of the KD of the receiver of the ticket. |
| <Access_limits> := | Limitations on when the ticket is valid. For example, a time period, or a counter that says how many times this ticket can be used. |
| <Max_derivation_level> := | How many levels of derivative tickets can be created. For example: A <Max_derivation_level> of zero forbids derivative tickets entirely. A level of two allows the receiver of a derivative ticket, that was made by the receiver of an original ticket, still create derivative tickets, but those tickets cannot be used to make derivative tickets. A special value such as −1 can be used to allow infinite levels of derivative tickets. |
| <Derivation_limits> := | Limits on what kind of derivative tickets may be created. For example, a ticket may be limited so that it only allows creation of one-day derivative tickets. |
| <Checksum> := | A secure checksum (e.g. MD5) of all the other information in the ticket (excluding nested tickets), encrypted with the secret key of the granter's KD. |
| <Derivative_ticket> := | <LID> <TID> <Receiver_public_key> <Access_limits> <Max_derivation_level><Derivation_limits> <Checksum> <Ticket> |

Figure 3:
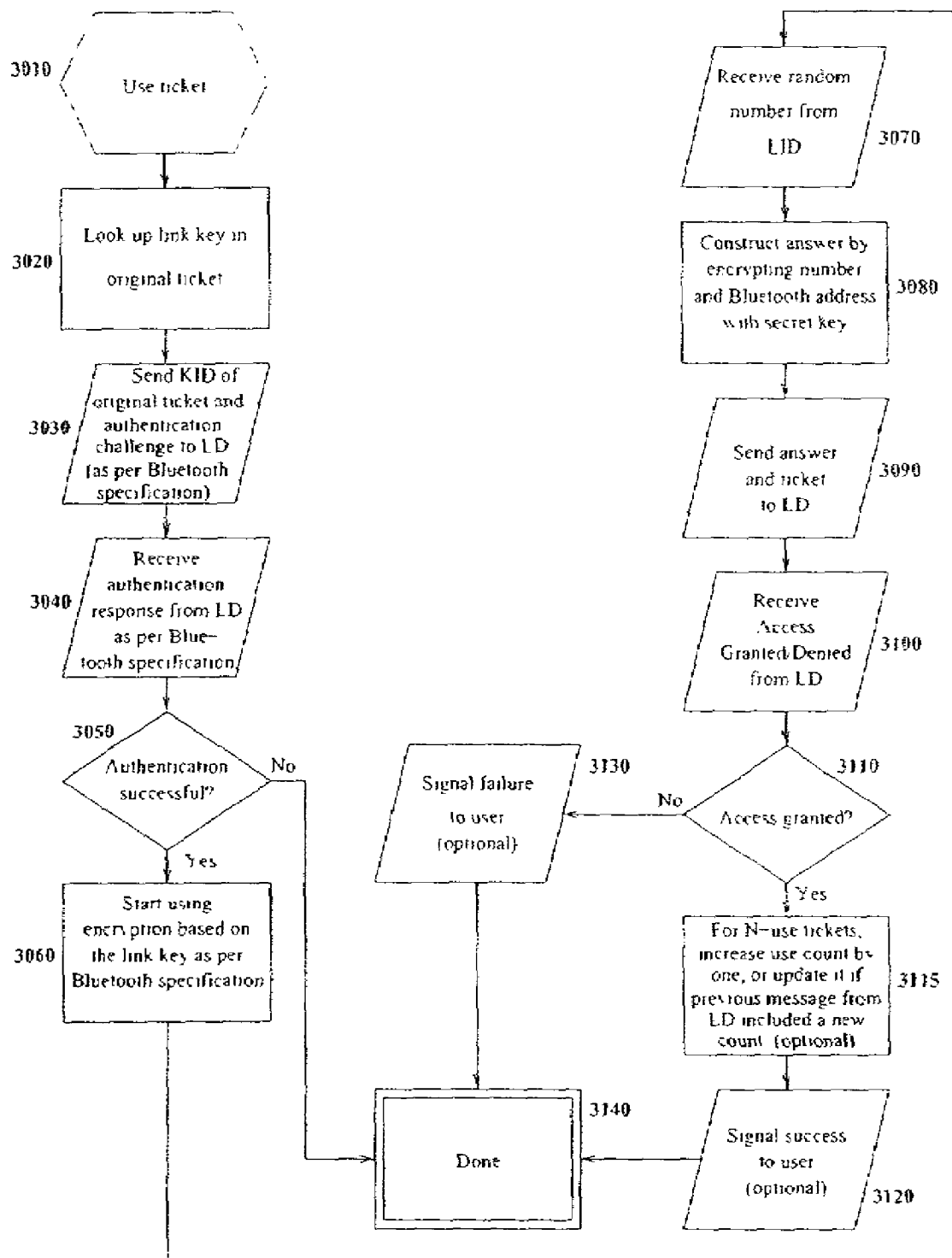
FIG. 3 is an embodiment of the flowchart for opening a lock with a ticket, from the key device point of view.
Figure 4:
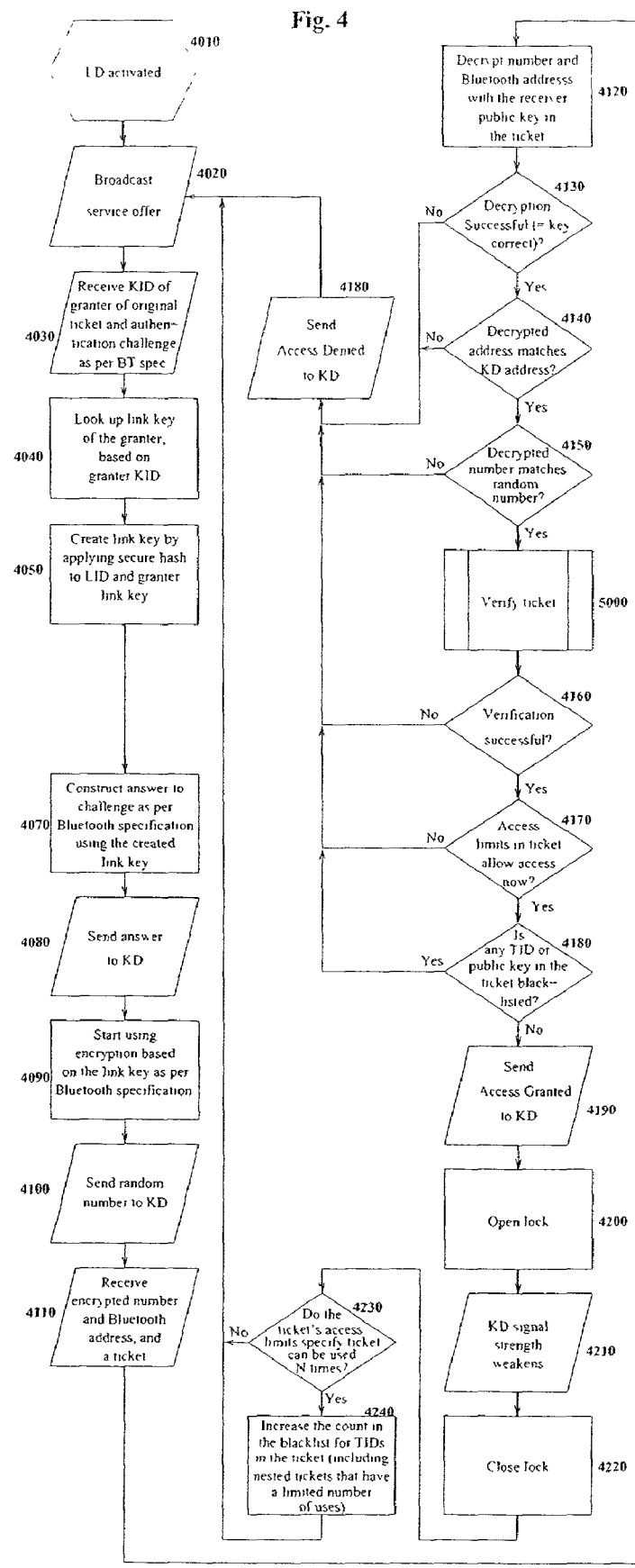
FIG. 4 is an embodiment of the flowchart for opening a lock with a ticket, from the lock device point of view.
Figure 5:
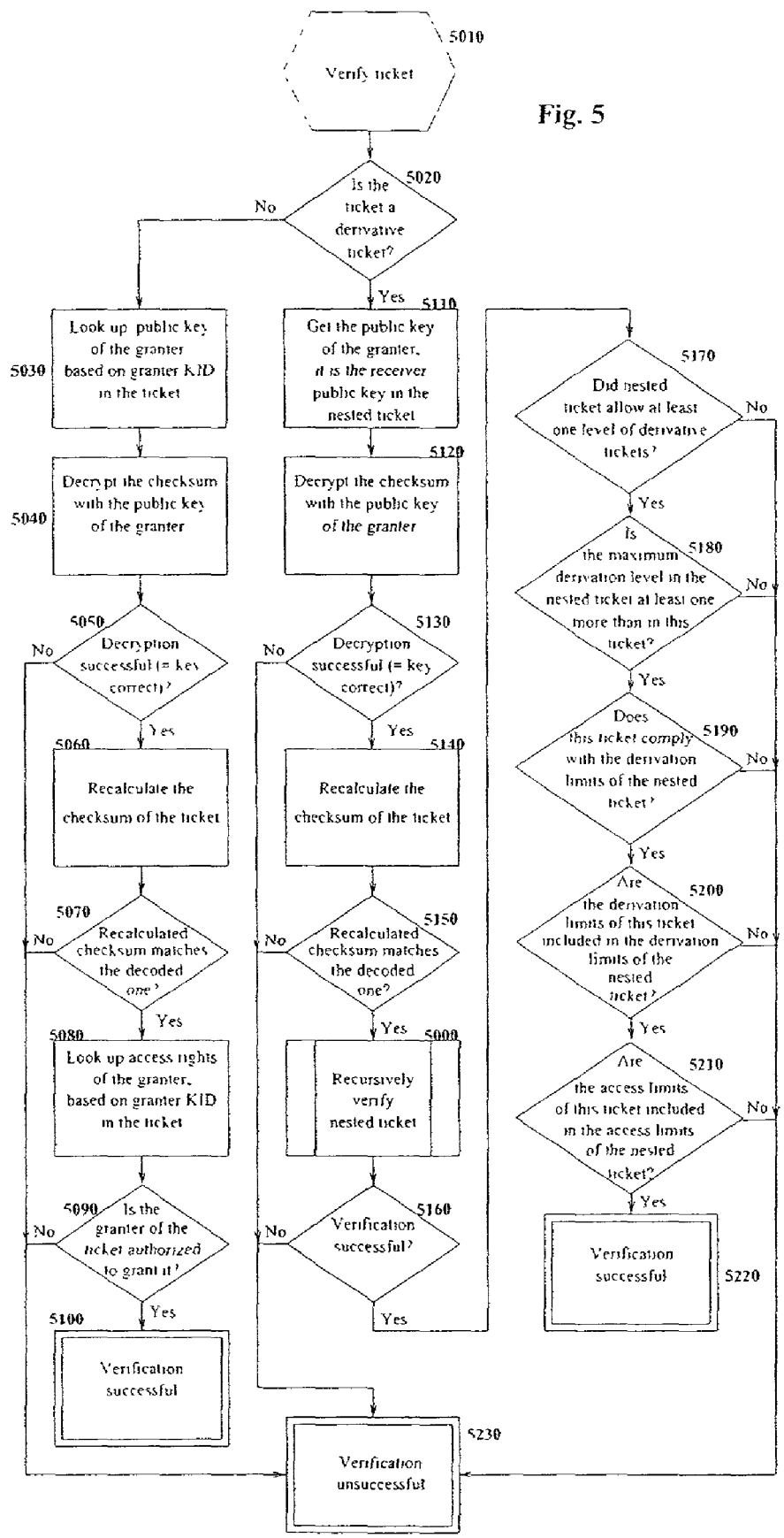
FIG. 5 is an embodiment of the flowchart for verifying a ticket, from the lock device point of view.
Figure 6:
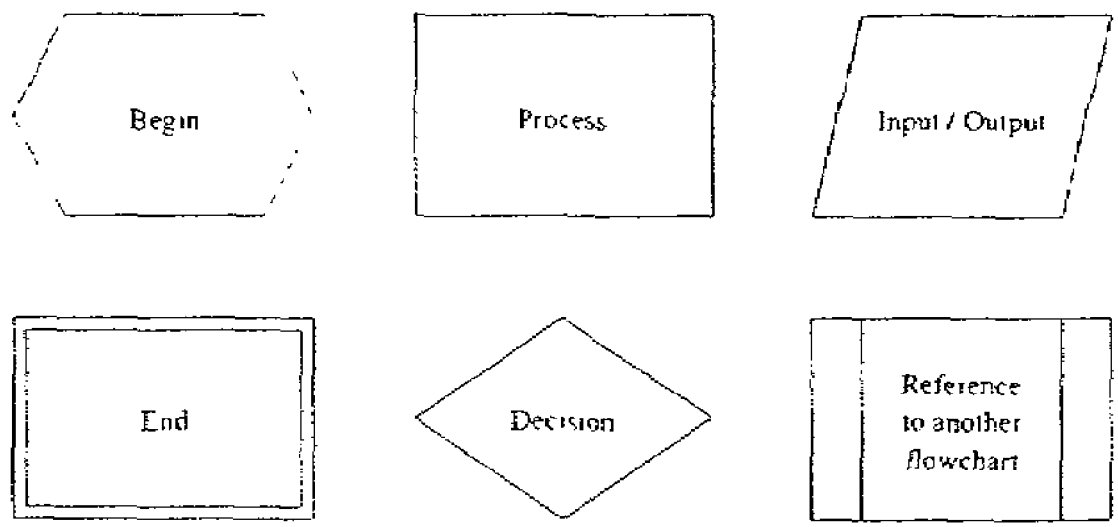
FIG. 6 is an embodiment of the key for the different symbols in the flowcharts.

FIG. 3 shows an embodiment of the process of using a ticket, from the KD point of view, as a flowchart. FIGS. 4 and 5 show embodiments of the process of using a ticket, from the LD point of view, as a flowchart verified (5000, 4160), the access rights of the user allow him to get in now (4170), and no TID or public key in the ticket is blacklisted (or, in the case of n-use tickets, above their use limit) (4180), then the user is authorized to open the lock (4190, 3100, 3110, 3120, 3140, 4200). If the ticket is n-use, and unshared, the KD may increase its use count to keep track of how many uses are left (3115). Also, the LD may include in the Access Granted message (4190) the number of times the ticket has been used. If the ticket is shared, this allows the KD to update its use counter to reflect the current situation.

9) Closing the lock again could be based on a simple timeout (lock stays open for a predefined time interval), but preferably the LD would use radio signal strength to get some measure of the distance to the KD, and when signal strength is sufficiently weak (4210), close the lock again (4220).

10) If the ticket's access limits specify that it is a n-use ticket (4230), then all TIDs in the ticket with a limited number of uses (nested tickets are included) are stored on the blacklist with a count of 1. If they have a validity limit date, that is stored on the blacklist as well, to allow it later to be purged of obsolete information. If some were already blacklisted, then the count for those is increased in the blacklist (4240).

FIG. 5 shows an embodiment of the verification process of a ticket.

1) If the ticket is not derivative (5020), the LD decrypts the checksum (5040) with the public key that corresponds to granter KID (5030), and verifies that the decryption succeeded (meaning that key was correct) (5050), the checksum is correct (5060, 5070), and that the granter KID is authorized to grant the ticket (access rights are stored within the LD) (5080, 5090, 5100).

2) If the ticket is derivative (5020), the LD decrypts the checksum with the public key of the granter (5120), which is the receiver public key in the original (nested) ticket (5110), and verifies that the decryption succeeded (meaning that key was correct) (5130), and the checksum is correct (5140,5150). It then recursively verifies the original ticket (5000, 5160), and checks that it allowed at least one level of derivative tickets (5170). It also checks that the level of derivative tickets allowed increases by at least one at each recursion level (5180), that limits on derivative tickets are observed (5190), that derivation limits are included in the derivation limits of the nested ticket (5200), and that access limits are always included in the access limits of the nested ticket (5210). The last two inclusion checks are necessary to prevent people from creating derivative tickets that are less restrictive that the ticket they possess.

3) If the ticket passes all the checks, it has been successfully verified (5220).

Keys can be added, removed, and their access rights can be modified. These are simple database operations. Keys are structured as a forest (a group of tree hierarchies). Each key must have been authorized either by an LD PIN (root keys), or by another key. The parent of a key is the key that authorized it.

Keys can be removed or their access rights modified only by keys above them in the hierarchy. Possibly a KD can also remove itself from a lock. PIN authorization allows everything ("root access"). A key cannot have wider access rights than its parent.

If a key is removed because it has been compromised, all keys below it in the hierarchy should also be removed.

For security reasons, users may want to change their secret keys periodically. Update of LDs can be done automatically, by allowing public keys in LDs to be updated by the owner of the keys. The KD must then store both the old and the new RSA key pair until all LDs have been updated.

The KD can remove the old RSA key pair once all LDs have been updated. This requires that the KD stores the LIDs of all LDs it has access to. As this increases the memory requirements of the KD, it would be an optional feature. The other option is that the old RSA key pair is removed manually by the user.

It is often not desirable for a door to unlock because someone with a KD walks nearby on the inside. The lock should be shielded against radio signals from that direction (doors can be opened from the inside without unlocking).

However, if the door should block movement also from the inside, the radio signals should be restricted so that there is a very small area immediately next to the door where KDs will open the door.

Also, to prevent unauthorized people from sneaking in when someone with a KD (that allows access) walks past the door, either the locations where KDs are effective on the outside should be limited to the immediate vicinity of the door, or confirmation should be required. Still another possibility is that an LD only opens the door if the KD stays close (determined by signal strength) for some time.

Some advantages for this system are:

Need to search for keys is removed. Doors unlock automatically (unless confirmation is required).

There is no key chain weighing down a user's pockets, nor a need to remember which key is which. One key opens all doors (as long as they have compatible locks).

There is no need to have a key hidden somewhere. For example, if a user is already on the road when he realizes someone should water his plants, he can send a ticket to his friend that is valid until the end of his trip. If he sets the ticket's max derivation level to higher than zero, his friend can in his turn delegate the responsibility to someone else and create a derivative ticket for that person.

If a user is stuck in traffic, and his friends are coming to visit, he can send them a one-time ticket.

Moving is simplified. The key data and Lock ID from the old lock are copied to the controller, the new lock is cleared, and the data from the old lock is copied to it.

Keys for friends and relatives can be created instantly and for free, and their access can be limited to reasonable hours.

A temporary ticket can be sent via Internet to allow an Internet store to deliver goods when you are not at home. The ticket might open your home door, but more likely a separate delivery area. Since the ticket is temporary (and/or one-time), it cannot be used by the store employee later to open the lock when inside would be deliveries from another store. If there is a separate delivery area, there is no need to trust the store.

If a car's ignition lock is replaced with an LD, car sellers can give limited-time tickets when you take a car for a test drive.

By installing LDs that control access to movie theaters, busses, etc., electronic tickets in KDs can be used instead of traditional paper tickets. Of course, KD public keys could be stored on the LDs as well, but tickets are easier to create.

By installing LDs that control access to computers, computer terminals, peripheral devices and/or to similar devices, etc. KDs can be used for gaining access and/or use to these and through these devices also access to databases and/or to data files stored therein and/or accessed through these. The use of tickets as described above can also be applied for accessing databases and/or data files as well as for accessing the computers and computer terminals.

Note, that passwords and similar traditional computer security constructs can be used to link the lock device to legacy systems. The lock device would then know the password(s), and would use it to give access to users who have authenticated themselves using a key device. The password would not ever be seen by the user.

Numerous additional modifications and variations of the present invention are possible in light of the above teachings. It is therefore to be understood within the scope of the appended claims, the invention may be practiced otherwise than as specifically described herein.

What is claimed is:

1. An apparatus comprising:
a processor configured to:
generate an electronic ticket for providing an electronic key device authorization to unlock an electronic lock device, the electronic ticket comprising a public key corresponding to the electronic key device and a link key configured to authenticate an identity of the electronic lock device,
wherein the apparatus is authorized to unlock the electronic lock device,
wherein the ticket is transmittable from the apparatus to the electronic key device and wherein the ticket is electronically signed by the apparatus using a private key of the apparatus,
wherein the public key corresponding to the electronic key device is configured to decrypt a code issued by the electronic lock device and encrypted by the electronic key device, and
wherein the link key of the electronic ticket is generated using a one-way hash of a link key of the apparatus and a lock identifier of the electronic lock device.

2. The apparatus according to claim 1, wherein the processor is further configured to wirelessly communicate using Bluetooth short range communication protocol.

3. The apparatus according to claim 1, wherein said electronic lock device is a virtual lock device in a form of a software module controlling access to a digital resource.

4. The apparatus according to claim 1, wherein said electronic lock device stores public keys for a plurality of authorized key holders.

5. The apparatus according to claim 1, wherein the public key is stored in a plurality of lock devices for which entry is authorized for the apparatus.

6. The apparatus according to claim 1, wherein a different public key is stored in each lock device for which entry is authorized for the apparatus.

7. The apparatus according to claim 1, wherein at least one of the apparatus and the electronic key device comprises a portable wireless device.

8. The apparatus according to claim 7, wherein at least one of the apparatus and the electronic key device comprises a wireless telephone.

9. The apparatus according to claim 7, wherein at least one of the apparatus and the electronic key device is wearable by a user.

10. The apparatus according to claim 1, wherein the apparatus further comprises a power source, non-volatile memory and a transmitter/receiver unit.

11. The apparatus according to claim 10, wherein at least one of the apparatus and the electronic key device further includes a user authentication device.

12. An apparatus comprising:
a processor configured to:
receive at least one electronic ticket transmitted from an electronic key device authorized to unlock an electronic lock device, wherein the at least one received electronic ticket comprises a public key corresponding to the apparatus and a link key configured to authenticate an identity of the electronic lock device, wherein the link key of the electronic ticket is generated using a one-way hash of a link key of the electronic key device and a lock identifier of the electronic lock device,
transmit the at least one electronic ticket to the electronic lock device,
receive a code issued by the electronic lock device,
encrypt the code using a private key of the apparatus, and
transmit the encrypted code to the electronic lock device, wherein the public key of the apparatus is configured to decrypt the encrypted code.

13. The apparatus according to claim 12, wherein said electronic lock device is a virtual lock device in a form of a software module controlling access to digital resources.

14. The apparatus according to claim 13, wherein the at least one electronic ticket grants access to at least part of said digital resources.

15. The apparatus according to claim 12, wherein the at least one electronic ticket further includes one or more access limits.

16. The apparatus according to claim 15, wherein the one or more access limits includes time of day.

17. The apparatus according to claim 15, wherein the one or more access limits includes authorization to generate further electronic tickets.

18. The apparatus according to claim 12, wherein the at least one electronic ticket is transmittable to one or more lock devices.

19. The apparatus according to claim 18, wherein said electronic lock device is a virtual lock device in a form of a software module controlling access to digital resources.

20. The apparatus according to claim 19, wherein at least one electronic ticket grants access to at least part of the digital resources.

21. The apparatus according to claim 12, wherein at least one of the apparatus and the electronic key device includes a display for indicating the number of available electronic tickets.

22. The apparatus according to claim 12, wherein the at least one electronic ticket includes an expiration date.

23. The apparatus according to claim 12, wherein the at least one electronic ticket includes a time of day restriction.

24. The apparatus according to claim 23, wherein said additional information contains user-related information.

25. The apparatus according to claim 12, wherein the electronic key device stores additional information unrelated to the private key.

26. The apparatus according to claim 25, wherein said additional information comprises a Social Security number.

27. The apparatus according to claim 12, wherein at least one of the apparatus and the electronic key device includes a personal identification number.

28. The apparatus according to claim 12, wherein at least one of the apparatus, the electronic key device and said electronic lock device includes authentication information in the form of coded information known to a user.

29. The apparatus according to claim 12, wherein at least one of the apparatus, the electronic key device and said electronic lock device includes authentication information in the form of a physical feature of a user.

30. The apparatus according to claim 12, wherein said electronic lock device stores a list of invalid key devices, and denies authorization to any one of the key devices in the list of invalid key devices.

31. The apparatus according to claim 12, wherein said electronic lock device stores a use counter for n-use electronic tickets.

32. The apparatus according to claim 12, wherein said electronic lock device includes an identification number where the identification number is hierarchical in relation to one or more other lock device identification numbers.

33. An apparatus comprising:
a processor configured to:
receive, from a first electronic key device, a ticket comprising a public key of the first electronic key device and a link key configured to authenticate an identity of the apparatus, wherein the link key of the electronic ticket is generated using a one-way hash of a link key of the first electronic key device and a lock identifier of the apparatus, wherein the ticket is generated by a second key device authorized to unlock the apparatus and wherein the ticket is electronically secured by a private key of the second electronic key device,
issue a code to the first electronic key device,
receive an encrypted code corresponding to the issued code encrypted using a private key of the first electronic key device,
determine a decrypted code by decrypting the encrypted code using the public key of the first electronic key device,
determine whether the decrypted code matches the issued code, and
in response to determining that the decrypted code matches the issued code, unlock the apparatus.

34. The apparatus according to claim 33, wherein the apparatus is a virtual lock device for controlling access to digital resources.

35. The apparatus according to claim 33, wherein at least one of the first and second electronic key devices is not user-interactive.

36. The apparatus according to claim 33, further comprising the second electronic key device, the second electronic key device including a control device configured to load the private key into the second electronic key device remotely and electronically.

37. The apparatus according to claim 36, wherein the control device further loads data into at least one other key device.

38. The apparatus according to claim 36, wherein confirmation data is input into the control device which forwards confirmation to the second electronic key device.

39. A method comprising:
generating a ticket on a first key device, wherein the first key device is authorized to unlock an electronic lock device, and wherein the ticket includes a public key of a second key device and a link key configured to authenticate an identity of the electronic lock device, wherein the link key of the electronic ticket is generated using a one-way hash of a link key of the first key device and a lock identifier of the electronic lock device;
electronically securing the ticket with a private key of the first key device; and
transmitting the ticket addressed to the second key device, wherein the public key of the second key device is configured to decrypt a code issued by the electronic device and encrypted by the second key device.

40. The method of claim 39, wherein the first key device is a mobile device.

41. The method of claim 39, wherein the ticket includes one or more use limits.

42. The method of claim 41, wherein the one or more use limits includes a time of day restriction.

43. The method of claim 41, wherein the one or more use limits includes an indication as to whether tickets may be generated by the second key device.

44. A method comprising:
receiving, at a first key device, a ticket from a second key device, wherein the second key device is authorized to unlock an electronic lock device, and wherein the ticket comprises a public key corresponding to the first key device and a link key configured to authenticate an identity of the electronic lock device, wherein the link key of the electronic ticket is generated using a one-way hash of a link key of the second key device and a lock identifier of the electronic lock device and wherein the ticket is secured by a private key of the second key device,
transmitting the ticket addressed to the electronic lock device,
receiving a code issued by the electronic lock device,
encrypting the code using a private key of the first key device, and
transmitting the encrypted code addressed to the electronic lock device.

45. The method of claim 44, wherein the ticket includes one or more use limits.

46. The method of claim 45, wherein the one or more use limits includes a time of day restriction.

47. A method comprising:
receiving, from a first electronic key device, a ticket comprising a public key of the first electronic key device and a link key configured to authenticate an identity of an electronic lock device, wherein the link key of the ticket is generated using a one-way hash of a link key of a second electronic key device and a lock identifier of the electronic lock device, wherein the ticket is generated by the second key device authorized to unlock the electronic lock device and wherein the ticket is electronically secured by a private key of the second electronic key device,
issuing a code to the first electronic key device,
receiving an encrypted code corresponding to the code encrypted using a private key of the first electronic key device,
determining a decrypted code by decrypting the encrypted code using the public key of the first electronic key device,
determining whether the decrypted code matches the issued code, and
in response to determining that the decrypted code matches the issued code, unlocking the electronic lock device.

48. The method of claim 47, wherein unlocking the electronic lock device includes unlocking a physical lock device in response to determining that the decrypted code matches the issued code.

49. The method of claim 47, wherein the issued code comprises a number.

50. One or more computer readable media storing computer readable instructions that, when executed, cause a processor to perform a method comprising:
receiving, from a first electronic key device, a ticket comprising a public key of the first electronic key device and a link key configured to authenticate an identity of an electronic lock device, wherein the link key of the ticket is generated using a one-way hash of a link key of a second electronic key device and a lock identifier of the electronic lock device, wherein the ticket is generated by the second key device authorized to unlock the electronic lock device and wherein the ticket is electronically secured by a private key of the second electronic key device, issuing a code to the first electronic key device, receiving an encrypted code corresponding to the code encrypted using a private key of the first electronic key device, determining a decrypted code by decrypting the encrypted code using the public key of the first electronic key device, determining whether the decrypted code matches the issued code, and in response to determining that the decrypted code matches the issued code, unlocking the electronic lock device.

51. The one or more computer readable media of claim 50, wherein unlocking the electronic lock device includes unlocking a physical lock device in response to determining that the decrypted code matches the issued code.

52. The one or more computer readable media of claim 50, wherein the issued code comprises a number.

53. One or more computer readable media storing computer readable instructions that, when executed, cause a processor to perform a method comprising:

receiving, at a first key device, a ticket from a second key device, wherein the second key device is authorized to unlock an electronic lock device, and wherein the ticket comprises a public key corresponding to the first key device and a link key configured to authenticate an identity of the electronic lock device, wherein the link key of the electronic ticket is generated using a one-way hash of a link key of the second key device and a lock identifier of the electronic lock device and wherein the ticket is secured by a private key of the second key device, transmitting the ticket addressed to the electronic lock device, receiving a code issued by the electronic lock device, encrypting the code using a private key of the first key device, and transmitting the encrypted code addressed to the electronic lock device.

54. The one or more computer readable media of claim 53, wherein the ticket includes one or more use limits.

55. The one or more computer readable media of claim 54, wherein the one or more use limits includes a time of day restriction.

56. One or more computer readable media storing computer readable instructions that, when executed, cause a processor to perform a method comprising:

generating a ticket on a first key device, wherein the first key device is authorized to unlock an electronic lock device, and wherein the ticket includes a public key of a second key device and a link key configured to authenticate an identity of the electronic lock device, wherein the link key of the electronic ticket is generated using a one-way hash of a link key of the first key device and a lock identifier of the electronic lock device;

electronically securing the ticket with a private key of the first key device; and transmitting the ticket addressed to the second key device, wherein the public key of the second key device is configured to decrypt a code issued by the electronic device and encrypted by the second key device.

57. The one or more computer readable media of claim 56, wherein the first key device is a mobile device.

58. The one or more computer readable media of claim 56, wherein the ticket includes one or more use limits.

* * * * *